United States Patent [19]
Shin et al.

[11] Patent Number: 6,014,311
[45] Date of Patent: *Jan. 11, 2000

[54] THIN STRUCTURE INFORMATION PROCESSING APPARATUS HAVING MAIN BOARD, POWER SUPPLY BOARD, HARD DISK DRIVE, BATTERY, AND MAIN BOARD ARRANGED SO AS NOT TO OVERLAP WITH RESPECT TO A PLANE

[75] Inventors: Takahiro Shin; Masuo Ohnishi, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,459

[22] Filed: Apr. 18, 1997

[30] Foreign Application Priority Data

Oct. 24, 1996 [JP] Japan ..................................... 8-282385

[51] Int. Cl.$^7$ .................. G06F 1/16; H05K 7/02
[52] U.S. Cl. ............................. 361/684; 361/680
[58] Field of Search ...................... 364/708.1; 312/223.2; 361/680–687

[56] References Cited

U.S. PATENT DOCUMENTS

| | | | |
|---|---|---|---|
| 4,894,792 | 1/1990 | Mitchell et al. ...................... | 364/708.1 |
| 5,058,045 | 10/1991 | Ma ....................................... | 364/708.1 |
| 5,132,876 | 7/1992 | Ma ....................................... | 361/685 X |
| 5,237,486 | 8/1993 | LaPointe et al. ...................... | 361/681 |
| 5,251,105 | 10/1993 | Kobayashi et al. ..................... | 361/683 |
| 5,325,262 | 6/1994 | Ma ........................................... | 361/681 |
| 5,422,784 | 6/1995 | Wakahara et al. ...................... | 361/680 |
| 5,426,564 | 6/1995 | Hsu ........................................ | 361/707 |
| 5,552,967 | 9/1996 | Seto et al. ............................. | 361/818 |
| 5,583,744 | 12/1996 | Oguchi et al. .......................... | 361/683 |

FOREIGN PATENT DOCUMENTS

| | | |
|---|---|---|
| 8-076885 | 3/1996 | Japan . |
| 8-076886 | 3/1996 | Japan . |
| 8-076887 | 3/1996 | Japan . |
| 8-076898 | 3/1996 | Japan . |

OTHER PUBLICATIONS

Macintosh Powerbook Duo 210, Dec. 1992 (See partial translation).

Addition of Duo 2xx Series Model http://www.link-club.or.jp/~gencha n/mac/duo2xxmod.html, publication date unknown (See partial translation).

(How to mak a Duo) http://www.bekkoame.ne.jp/~maakun/madeduo/madeduo.html (See partial translation).

Patent Abstracts of Japan, vol. 18, No. 327 (P–1757), Jun. 21, 1994 & JP 06–075661 A (Sootec:KK), Mar. 18, 1994.

*Primary Examiner*—Lynn D. Feild
*Attorney, Agent, or Firm*—Staas & Halsey LLP

[57] ABSTRACT

A thin structure information processing apparatus includes a body having a substantially planar structure and an interior accommodating therein at least a main board; a power supply board; a built-in battery; and a built-in hard disk drive. The main board, the power supply board, and the built-in battery and the built-in hard disk drive are arranged in such a manner they are not substantially imposed on each other (i.e., do not overlap each other) with respect to a major plane of the substantially planar structure.

28 Claims, 5 Drawing Sheets

THIN STRUCTURE INFORMATION PROCESSING APPARATUS HAVING MAIN BOARD, POWER SUPPLY BOARD, HARD DISK DRIVE, BATTERY, AND MAIN BOARD ARRANGED SO AS NOT TO OVERLAP WITH RESPECT TO A PLANE

BACKGROUND OF THE INVENTION

1. Field of the Invention

This invention relates to an information processing apparatus such as a notebook-type personal computer, a word processor, and so forth. More particularly, it relates to an information processing apparatus having a thin structure.

As the portability of an information processing apparatus, such as a portable computer, has been improved in recent years, a small thickness has been required. Therefore, an information processing apparatus having a small thickness must be provided.

2. Related Art

In conventional information processing apparatuses, internal modules and units that constitute an information processing apparatus are disposed as portions in superposition with one another in the direction of height. For example, a built-in battery and a built-in hard disk drive (HDD) are disposed below a keyboard module or a main board. In the conventional information processing apparatus, an upward connector is disposed on the surface of the main board facing the keyboard module. When two PC card slots are provided to the conventional information processing apparatus, they are disposed in a stack form in the direction of height.

As examples of the prior art references, Japanese Unexamined Patent Publication (Kokai) Nos. 8-76887 and 8-76898 describe an information processing apparatus having a reduced thickness structure. Japanese Unexamined Patent Publication (Kokai) No. 8-76885 discloses an information processor equipped with speakers mounted to a substrate for peripheral processing and for a speaker, and Japanese Unexamined Patent Publication (Kokai) No. 8-76886 discloses a structure wherein a cover casing to which a liquid crystal display is fitted is provided with a reduced thickness.

As described above, the thickness of the information processing apparatus of the prior art is the sum of the height of respective internal modules disposed in superposition with one another, and becomes greater than the height of each internal module by the superposition thickness. Further, a gap is necessary between the main board and the keyboard module so that the connector and cables can be disposed inside it. Further, when two PC card slots are installed, the thickness becomes greater than when one PC card slot is disposed.

SUMMARY OF THE INVENTION

It is therefore an object of the present invention to provide an information processing apparatus which further promotes the reduction of thickness and improves portability.

According to the present invention, there is provided a thin structure information processing apparatus comprising: a body of the information processing apparatus, the body having a substantially planar structure and accommodating therein at least a main board; a power supply board; a built-in battery; a built-in hard disk drive; and the main board, the power supply board, the built-in battery and the built-in hard disk drive being arranged in such a manner they are not imposed relatively to each other and with respect to a major plane of the substantially planar structure.

In another aspect of the present invention, there is provided a thin structure information processing apparatus comprising: a body of the information processing apparatus, the body having a substantially planar structure and accommodating therein at least a main board; a power supply board; a built-in battery; a built-in hard disk drive; and the main board, the power supply board, the built-in battery and the built-in hard disk drive being arranged in such a manner they are not imposed each other with respect to a plane of the substantially planar structure; the body further comprising: a key board module; a palm rest; and the built-in battery and the a built-in hard disk drive are arranged in such a manner that they do not occupy a space under the key board module.

The main board is provided with at least one connector projecting upward from an upper surface of the main board and the connector is arranged at a position other than an area where the main board and the key board module are imposed.

The main board and the key board module are arranged substantially in parallel to each other so that a gap is defined between the main board and the key board module and the body has at least two PC-card slots which are arranged in such a manner that these PC-card slots are not mutually imposed with respect to each other, but they are located within the gap.

BRIEF DESCRIPTION OF THE DRAWINGS

FIG. 8 is a view of a second embodiment of the invention, corresponding to that of FIG. 2 but wherein a notch is formed in a main board at which a PC-card slot is disposed.

DESCRIPTION OF THE PREFERRED EMBODIMENTS

Hereinafter, information processing apparatuses according to preferred embodiments of the present invention will be explained in detail with reference to the accompanying drawings.

Figure 1:
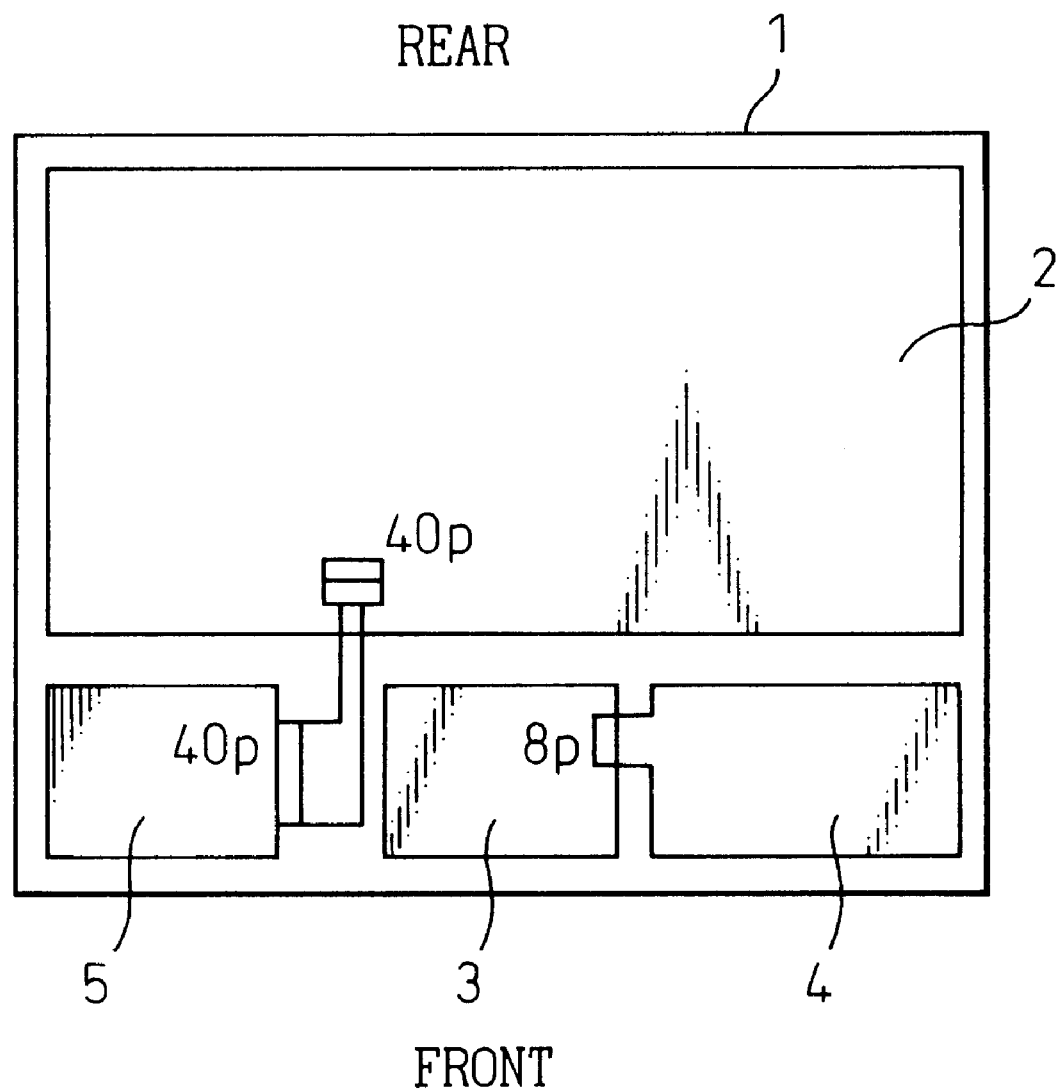
FIG. 1 is a plan view showing the disposition and planar construction of internal modules of an information processing apparatus according to the present invention.
Figure 2:
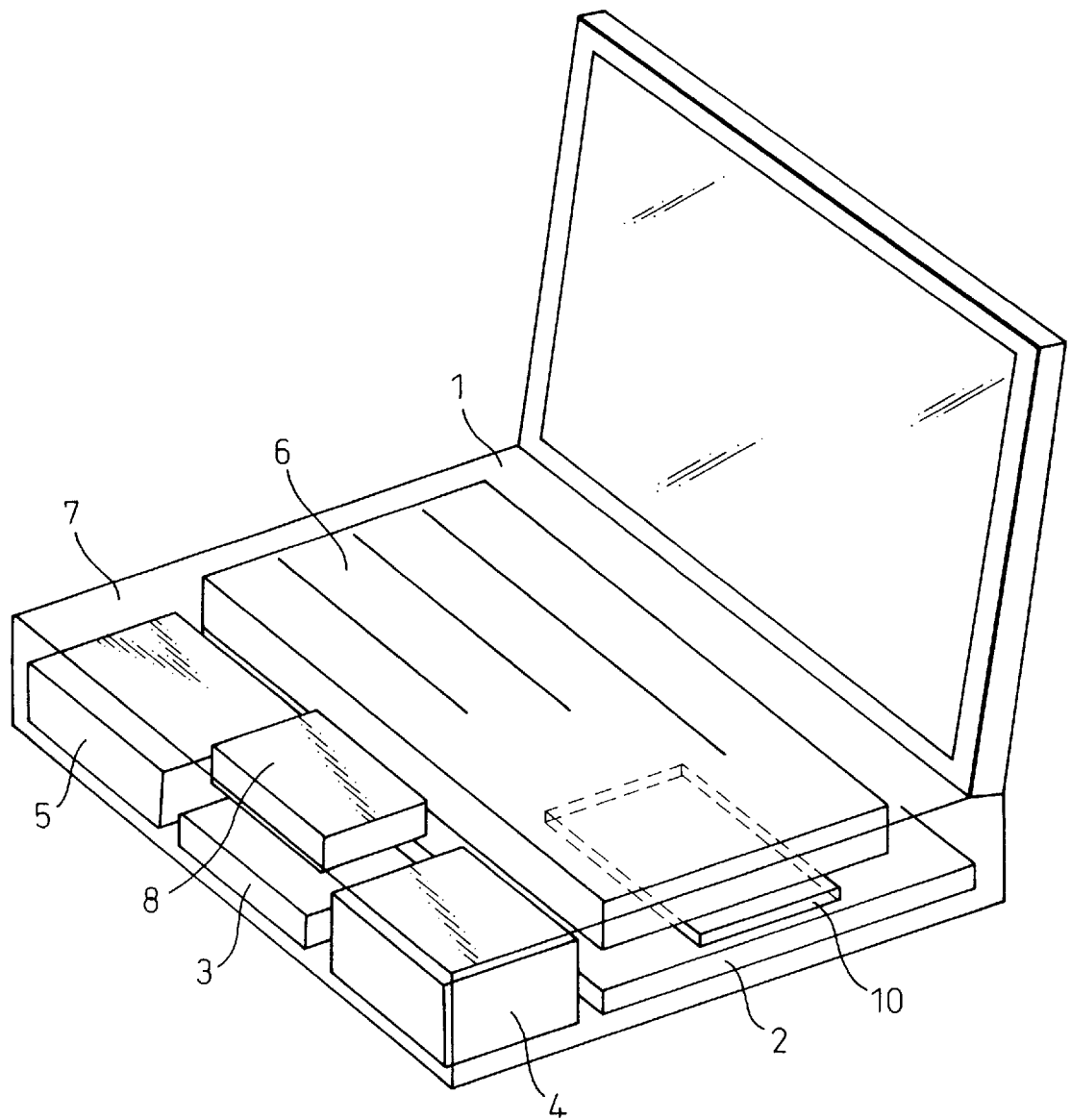
FIG. 2 is a perspective view showing the disposition and construction of the internal modules of the information processing apparatus when they are viewed from an oblique direction.

FIG. 1 is a plan view showing the disposition and construction of internal modules within an interior of the information processing apparatus according to the present invention, and FIG. 2 is a perspective view when the disposition and construction is viewed from the oblique direction. In the drawings, reference numeral 1 denotes a main body of an information processing apparatus, reference numeral 2 denotes a main board, reference numeral 3 denotes a power supply board, reference numeral 4 denotes a built-in battery, reference numeral 5 denotes a built-in HDD (hard disk drive), reference numeral 6 denotes a keyboard module, reference numeral 7 denotes a palm rest, reference numeral 8 denotes a pointing device, and reference numeral 10 denotes a PC-card slot. As shown in FIG. 1, the main board 2 is positioned in a wide rear area of the interior away from the side of an operator (not shown). The power supply board 3 is disposed at the center of the front part of the main board 2, the built-in battery 4 is disposed on the right side and the built-in HDD 5 is disposed on the left side. Further, these members are so disposed within the interior as not to overlap with one another plane-wise (i.e., so as to be substantially not superimposed relatively to each other). Incidentally, the main board 2 and the built-in HDD 5 are connected by cables and a connectors 40*p*, and the power supply board 3 and the built-in battery 4 are connected by a cable and a connector 8*p*.

Figure 5:
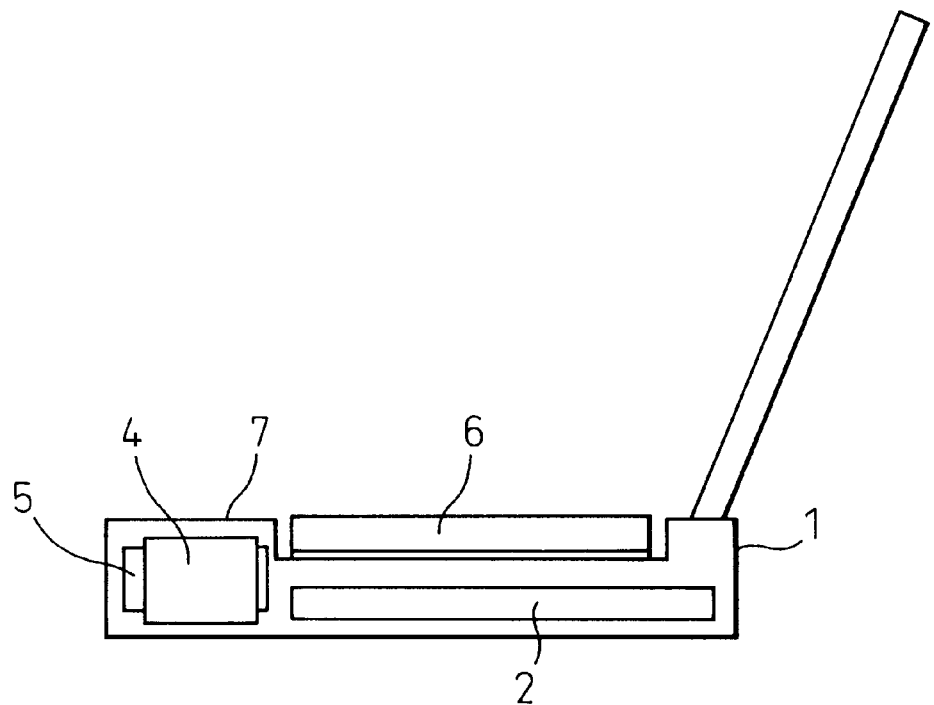
FIG. 5 is a side view showing the disposition of the internal modules of the information processing apparatus according to the present invention.

The built-in battery 4 and the built-in HDD 5 at the right and left sides of the front portion have a relatively large height, are not therefore disposed below the keyboard module 6 but are disposed below the palm rest 7 where the greatest height can be secured (see also FIG. 5). The power supply board 3 at the center of the front portion is lower than the built-in battery 4 and the built-in HDD 5, and is therefore disposed below the pointing device 8 for moving a cursor.

Figure 3:
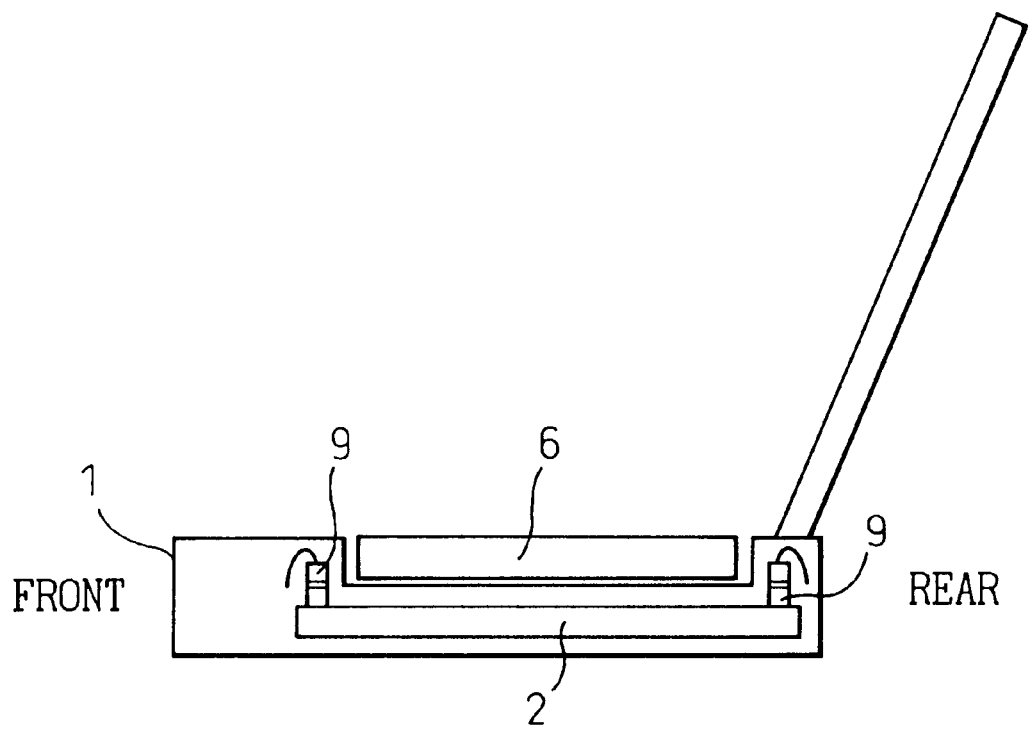
FIG. 3 is a side view showing the disposition of an upward connector disposed on a main board.
Figure 6:
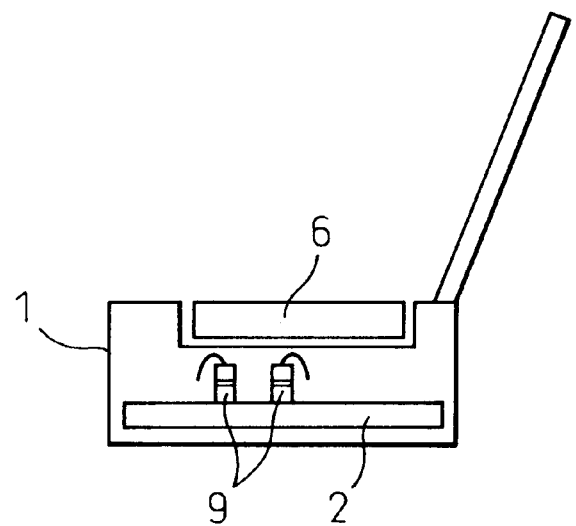
FIG. 6 is a side view showing the disposition of a connector of a main board in an information processing apparatus according to the prior art.

Since the main board 2 has a relatively small thickness, it is disposed in superposition with the keyboard module 6. As shown in FIG. 3, however, the upward connector 9 connected to the main board 2 is disposed at a position other than the overlapping position of the main board 2 with the keyboard module 6, such as at the front and rear end positions of the main board 2 deviated from the area of the keyboard module 6 as viewed from the side of the operator (not shown). Other electronic components (not shown) disposed on the main board 2 are far thinner than the connector 9. Therefore, even when they are disposed at overlapping positions with the keyboard module 6, the internal thickness of the information processing apparatus does not increase much as a whole. In consequence, the necessary internal thickness can be much reduced in comparison with the information processing apparatus according to the prior art (an example of which is shown in FIG. 6) wherein the connector 9 is disposed below the keyboard module 6.

By the way, the upward connector 9 may be disposed at any position of the main board 2 other than the overlapping position between the main board 2 and the keyboard module 6. For example, it can be disposed at the left end and/or at the right end of the main board 2.

Figure 4:
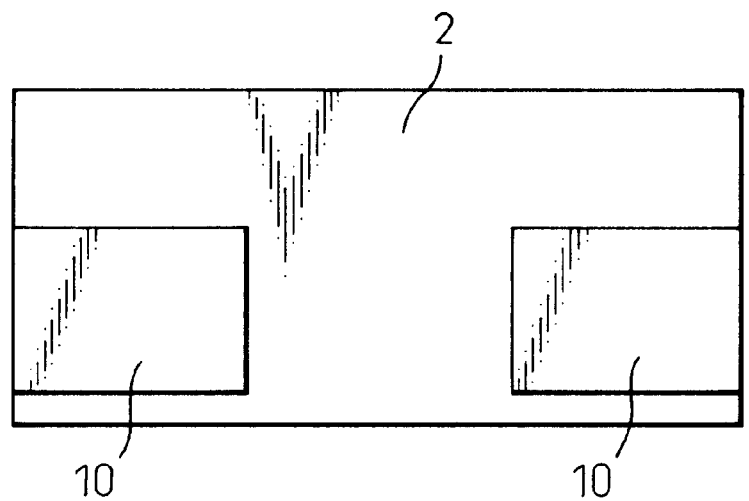
FIG. 4 is a side view showing the disposition of PC-card slots.

FIG. 4 shows the positional relationship between the main board 2 and PC-card slots 10 when two cards for extending the functions, that is, two PC-card slots 10, are provided. As shown in this drawing, the two PC-card slots 10 are disposed at the right and left positions of the main board so as not to overlap with each other as viewed from the side of the operator (not shown). Each PC-card slot 10 is disposed between the main board 2 and the keyboard module 6 as shown in FIG. 2. Therefore, the operator can load the necessary PC-cards (not shown) from the right and left side surfaces of the information processing apparatus. Incidentally, though only one PC-card slot 10 is shown disposed on the right side in FIG. 2, two PC-card slots 10 can be disposed on both right and left sides. Furthermore, an additional PC-card slot may, of course, be disposed in addition to the right and left positions, if possible.

In order to further reduce the thickness and as shown in FIG. 8, the portion of the main board 20 corresponding to the disposition portion of the PC-card slot 10' may be cut off to define a notch portion 20, and each PC-card slot 10' can be disposed at this notch portion 20.

Figure 7:
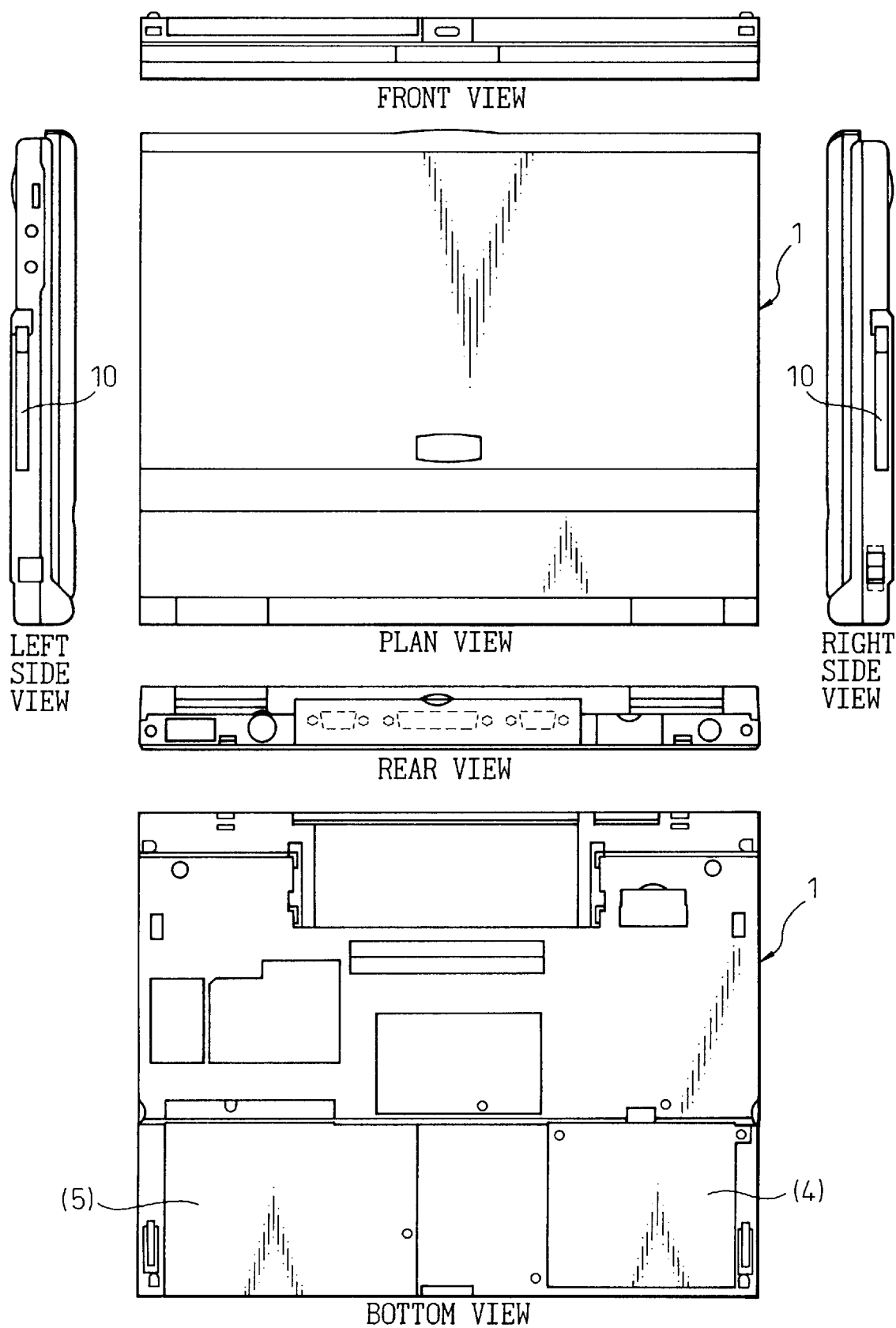
FIG. 7 shows six views of a thin information processing apparatus according to one embodiment of the present invention.

FIG. 7 shows the appearance of the information processing apparatus of the present invention in six views. The outer dimension of the information processing apparatus 1 of this invention is 297 mm width, 232 mm depth and 28.2 mm height, and the thickness can be thus reduced.

According to the present invention described above, the main board, the power supply board, the built-in battery and the built-in HDD are disposed in such a manner as not to overlap with one another, at portions other than the connector portions for connecting them, respectively. Therefore, the necessary internal thickness of the information processing apparatuses can be made smaller than that of the prior art apparatuses, and the present invention can contribute to the reduction of the thickness and to the improvement of portability of the information processing apparatus.

Because the built-in battery and the built-in HDD are not disposed below the keyboard module but are disposed below the palm rest portion where the greatest height can be secured, the present invention can contribute to the reduction of thickness of the information processing apparatus and to the improvement of its portability.

Because the upward connectors of the main board are disposed at the positions other than the position immediately below the keyboard module such as at the front end or the rear end when the main board is viewed from the front, the thickness of the apparatus can be reduced by the overlapping thickness with the keyboard module. Therefore, the present invention can contribute to the reduction of the thickness of the apparatus and to the improvement of its portability.

Furthermore, because the two PC-card slots are disposed so as not to be superposed in the direction of thickness, the provision of such PC-card slots does not invite an increase in the thickness but can contribute to the reduction of the thickness of the information processing apparatus and to the improvement of its portability.

It should be understood by those skilled in the art that the foregoing description relates to only a preferred embodiment of the disclosed invention, and that various changes and modifications may be made to the invention without departing from the spirit and scope thereof.

We claim:

1. A thin structure electronic device, comprising:
   a body having a substantially planar structure defining a major plane and having disposed in an interior thereof at least:
   an internal main board,
   a notch portion in said main board,
   at least one card slot disposed at said notch portion,
   a power supply board,
   a built-in battery, and
   a built-in dynamic information storage device; and
   said main board, said power supply board, said built-in battery and said built-in dynamic information storage device are arranged in such a manner that they are substantially not superimposed relatively to each other with respect to the major plane of said substantially planar body structure.

2. An electronic device as set forth in claim 1, wherein said body has at least one slot.

3. An electronic device as set forth in claim 2, wherein said slot is a card slot.

4. An electronic device as set forth in claim 1, wherein said dynamic information storage device is a hard disk drive.

5. A thin structure electronic device, comprising:
a body having a substantially planar structure and an interior and accommodating therein at least:
a main board having a major surface,
a power supply board,
a built-in battery, and
a built-in hard disk drive,
said main board, said power supply board, said built-in battery and said built-in hard disk drive being arranged in such a manner that they are substantially not superimposed relatively to each other in a first direction perpendicular to a plane of said substantially planar structure;
a keyboard module disposed on said body and superimposed relatively to and separated by a space, in the first direction, from a portion of the major surface of the main board; and
said built-in battery and said built-in hard disk drive are arranged in such a manner that they do not occupy the space under, and are not substantially superimposed in the first direction relatively to, said keyboard module and elements of a height in the first direction greater than the space are arranged at positions on the main surface of the main board other than the portion with respect to which the keyboard module is superimposed.

6. An electronic device as set forth in claim 5, wherein said main board has at least one connector thereon, projecting upwardly from the major surface of said main board and arranged at a position on the major surface other than the portion thereof with respect to which said keyboard module is superimposed.

7. An electronic device as set forth in claim 6, wherein:
said body has at least two slots disposed within said space and which are not mutually superimposed.

8. An electronic device as set forth in claim 7, wherein each of said two slots is a card slot.

9. A thin structure electronic device comprising:
a body having a substantially planar structure with an interior accommodating therein at least:
a main board having a major surface,
a power supply board,
a built-in battery, and
a built-in dynamic information storage device,
said main board, said power supply board, said built-in battery and said built-in dynamic information storage device being arranged in such a manner that they are substantially not superimposed relatively to each other in a first direction perpendicular to a plane of said substantially planar structure;
a keyboard module, disposed on said body and superimposed relatively to, and separated by a space in the first direction from a portion of the major surface of the main board; and
said built-in battery and said built-in dynamic information storage device being arranged in such a manner that they do not occupy the space under, and are not substantially superimposed in the first direction relatively to, said keyboard module and elements of a height in the first direction greater than the space are arranged at positions on the main surface of the main board other than the portion with respect to which the keyboard module is superimposed.

10. An electronic device as set forth in claim 9, further comprising: at least one connector projecting upwardly from a position on the major surface of said main board other than the portion thereof with respect to which said keyboard module is superimposed.

11. A thin structure electronic device as recited in claim 9, wherein the elements comprise upstanding connectors.

12. An electronic device comprising:
a body having a substantially planar structure and an interior and accommodating therein at least:
a main board having a major surface,
a power supply board,
a built-in battery, and
a built-in hard disk drive,
said main board, said power supply board, said built-in battery and said built-in hard disk drive being arranged in such a manner that they are substantially not superimposed relatively to each other in a first direction perpendicular to a plane of said substantially planar structure;
a keyboard module disposed on said body and superimposed relatively to and separated by a space in the first direction from, a portion of the major surface of the main board; and
said built-in battery and said built-in hard disk drive are arranged in such a manner that they do not occupy the space under, and are not substantially superimposed relatively to, said keyboard module; and
said body has at least one slot disposed within said space.

13. An electronic device as set forth in claim 12, wherein:
said body has two slots disposed within said space and which are not mutually superimposed; and
each of said two slots is a card slot.

14. A thin structure electronic device, comprising:
a body having a substantially planar structure defining a major plane and an interior accommodating therein at least:
a main board having a major surface and a notch portion,
a built-in battery;
a built-in dynamic information storage device,
said main board, said built-in battery and said built-in dynamic information storage device are arranged so as to be substantially not superimposed relatively to each other in a first direction perpendicular to the plane of said substantially planar structure; and
said body has at least one slot therein, disposed at and aligned with said notch portion of said main board.

15. An electronic device as set forth in claim 14, wherein said slot is a card slot.

16. An electronic device as set forth in claim 14, wherein said body has two slots therein and which are not mutually superimposed; and
each of said two slots is a card slot.

17. An electronic device as set forth in claim 14, wherein said dynamic information storage device is a hard disk drive.

18. A thin structure electronic device comprising:
a body having a substantially planar structure with an interior accommodating therein at least:
a main board,
a built-in battery, and
a built-in dynamic information storage device,
said main board, said built-in battery and said built-in dynamic information storage device being arranged in such a manner that they are substantially not superimposed relatively to each other with respect to a major plane of said substantially planar structure;

a keyboard module disposed on said body substantially parallel to the main board and with a space thereunder, separating the keyboard module from the main board;

said built-in battery and said built-in dynamic information storage device being arranged in such a manner that they do not occupy the space under, and are not substantially superimposed relatively to, said keyboard module; and at least one slot located within the space.

19. An electronic device as set forth in claim 18, wherein said body has at least two slots located within said space and which are not mutually superimposed with respect to each other.

20. An electronic device as set forth in claims 19 wherein each said slot is a card slot.

21. A thin structure electronic device as recited in claim 18, wherein the elements comprise upstanding connectors.

22. A thin structure electronic device comprising:

a body having a substantially planar structure accommodating therein at least:
  a main board having a major surface,
  a built-in battery, and
  a built-in dynamic information storage device, said main board, said built-in battery and said built-in dynamic information storage device being arranged in such a manner that they are substantially not superimposed relatively to each other in a first direction perpendicular to a plane of said substantially planar structure;

a keyboard module disposed on the body and superimposed relatively to and separated by a space, in the first direction, from a portion of the major surface of the main board;

said built-in battery and said built-in dynamic information storage device being arranged in such a manner that they do not occupy the space under, and are not substantially superimposed in the first direction relatively to, said keyboard module; and at least one connector, mounted on and projecting upwardly from the major surface of said main board at a position thereon other than the portion with respect to which said keyboard module is superimposed.

23. A thin structure electronic device comprising:

a body having a substantially planar structure of upper and lower major surfaces including a generally rectangular periphery of generally parallel front and back edges and generally parallel first and second side edges, together defining an interior of the body including front and rear contiguous interior portions, the rear interior portion being larger than the front interior portion;

a main board, having an upper major surface, disposed within the interior of the body in parallel relationship to the upper and lower body surfaces;

a keyboard module mounted on the upper major surface of the body and disposed in substantially superimposed, generally parallel relationship to the main board and separated in a first direction from the upper main surface of the main board by a space of a first dimension in a first direction perpendicular to the upper main surface of the main board and located in the rear interior portion of the body and with the keyboard module exposed at the upper major surface and elements of a second dimension in the first direction greater than the first dimension being mounted on the main board at positions thereon other than the portion with respect to which the keyboard module is superimposed; and a built-in dynamic information storage device and a built-in battery received in corresponding parts of the front interior portion and a power supply board received in a further corresponding part of the front interior portion and affording a space thereabove, extending to the upper major surface, for receiving a further component in superimposed relationship thereon.

24. The apparatus as recited in claim 23, wherein the further component comprises a pointing device.

25. The apparatus as recited in claim 23, wherein the keyboard module and the main board are spaced by a gap therebetween, further comprising at least one PC card slot extending through a corresponding sidewall into the gap.

26. The apparatus as recited in claim 23, further comprising at least two PC card slots disposed within the gap in laterally spaced and not mutually superimposed relationship therewithin.

27. The apparatus as recited in claim 23 wherein the dynamic information storage device comprises a hard disk memory.

28. A thin structure electronic device as recited in claim 23, wherein the elements comprise upstanding connectors.

* * * * *